(12) United States Patent
Hu et al.

(10) Patent No.: US 11,942,124 B1
(45) Date of Patent: Mar. 26, 2024

(54) SLIDER AIR BEARING DESIGNS WITH SIDE BLOCKER FOR CONTAMINATION ROBUSTNESS

(71) Applicant: Western Digital Technologies, Inc., San Jose, CA (US)

(72) Inventors: Yong Hu, San Ramon, CA (US); Lee K. Dorius, San Jose, CA (US); Hung V. Nguyen, San Jose, CA (US); Taichi Nakamura, Sagamihara (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/350,544

(22) Filed: Jul. 11, 2023

Related U.S. Application Data

(60) Provisional application No. 63/380,666, filed on Oct. 24, 2022.

(51) Int. Cl.
    *G11B 5/60* (2006.01)
    *F16C 32/06* (2006.01)

(52) U.S. Cl.
    CPC ........ *G11B 5/6082* (2013.01); *F16C 32/0603* (2013.01); *F16C 2370/12* (2013.01)

(58) Field of Classification Search
    CPC . G11B 5/6082; F16C 32/0603; F16C 2370/12
    USPC ..................... 360/236.3, 235.4, 236.2, 235.5
    See application file for complete search history.

(56) References Cited

U.S. PATENT DOCUMENTS

| | | | |
|---|---|---|---|
| 5,936,806 A | 8/1999 | Pan et al. | |
| 6,226,859 B1 | 5/2001 | Dorius et al. | |
| 6,333,835 B1 * | 12/2001 | Kang | G11B 5/6005 |
| 6,594,113 B2 | 7/2003 | Rao et al. | |
| 6,661,611 B1 * | 12/2003 | Sannino | G11B 21/21 |
| | | | 360/235.8 |
| 6,661,612 B1 * | 12/2003 | Peng | G11B 21/21 |
| | | | 360/236.1 |
| 7,616,405 B2 * | 11/2009 | Hu | G11B 5/6005 |
| | | | 360/236.2 |
| 7,760,468 B2 | 7/2010 | Cha et al. | |
| 8,009,389 B2 | 8/2011 | Bolasna et al. | |
| 8,081,400 B1 * | 12/2011 | Hu | G11B 5/6082 |
| | | | 360/236.3 |

(Continued)

OTHER PUBLICATIONS

J. White, "Design of Optimized Opposed Slider Air Bearings for High-Speed Recording on a Metal Foil Disk," J. Tribol. Apr. 2006, 128(2): 327-334.

(Continued)

*Primary Examiner* — Craig A. Renner

(74) *Attorney, Agent, or Firm* — Jacobsen IP Law; Krista S. Jacobsen

(57) ABSTRACT

A slider may include a first side-edge surface, a second side-edge surface, and an air-bearing surface (ABS) comprising: a first side cavity adjacent to the first side-edge surface, and a first island side blocker situated at a mouth of the first side cavity, wherein: a first outer surface of the first island side blocker forms a portion of the first side-edge surface, a second outer surface of the first island side blocker is recessed from the first side-edge surface, a first side opening is situated on a leading side of the first island side blocker, and a second side opening is situated on a trailing side of the first island side blocker.

23 Claims, 9 Drawing Sheets

(56) References Cited

U.S. PATENT DOCUMENTS

| | | | | |
|---|---|---|---|---|
| 8,164,860 B1* | 4/2012 | Ambekar | ............. | G11B 5/6082 |
| | | | | 360/236.2 |
| 8,174,794 B2* | 5/2012 | Dorius | ................. | G11B 5/6005 |
| | | | | 360/236.4 |
| 8,184,405 B1 | 5/2012 | Zheng et al. | | |
| 9,190,090 B1 | 11/2015 | Zhang et al. | | |
| 10,796,721 B1* | 10/2020 | Rakshit | ................. | G11B 17/32 |
| 11,232,812 B1 | 1/2022 | Zheng et al. | | |
| 2002/0089790 A1* | 7/2002 | Stoebe | ................. | G11B 5/6082 |
| | | | | 360/235.8 |
| 2002/0145828 A1 | 10/2002 | Mundt et al. | | |
| 2004/0095680 A1* | 5/2004 | Takahashi | ............ | G11B 5/6082 |
| | | | | 360/236.1 |
| 2008/0024924 A1* | 1/2008 | Bolasna | ................ | G11B 5/6005 |
| 2009/0059432 A1* | 3/2009 | Kubotera | ............. | G11B 5/6005 |
| | | | | 360/236.6 |
| 2009/0141402 A1* | 6/2009 | Hanyu | ................. | G11B 5/6082 |
| | | | | 360/235.5 |
| 2009/0310259 A1* | 12/2009 | Hanyu | ................. | G11B 5/6005 |
| | | | | 360/235.6 |
| 2010/0238592 A1* | 9/2010 | Mizutani | .............. | G11B 5/6005 |
| 2011/0195275 A1 | 8/2011 | Huha et al. | | |
| 2011/0317311 A1* | 12/2011 | Kushima | .............. | G11B 5/6082 |
| 2012/0050918 A1* | 3/2012 | Ambekar | ............ | G11B 5/6082 |
| 2019/0259420 A1* | 8/2019 | Furutani | .............. | G11B 5/6082 |
| 2019/0267038 A1* | 8/2019 | Higashiya | ................ | G11B 5/40 |

OTHER PUBLICATIONS

D. Pan et al., "Effect of Pitch and Roll Static Angle on Lubricant Transfer Between Disk and Slider," Tribol Lett (2014) 53:261-70.

* cited by examiner

SLIDER AIR BEARING DESIGNS WITH SIDE BLOCKER FOR CONTAMINATION ROBUSTNESS

CROSS-REFERENCE TO RELATED APPLICATIONS

This application claims the benefit of, and hereby incorporates by reference in its entirety for all purposes, U.S. provisional application No. 63/380,666, filed Oct. 24, 2022 and entitled "SLIDER AIR BEARING DESIGNS WITH SIDE BLOCKER FOR CONTAMINATION ROBUSTNESS".

BACKGROUND

Data storage systems are used to store large amounts of information. A data storage system typically includes a read/write transducer for retrieving and storing information. Some data storage systems use rotating storage devices, such as rotating optical devices (e.g., CD and DVD drives) or hard disk drives containing rotating magnetic disks (also referred to as platters or media). In some such data storage systems, a suspended slider supports a magnetic head that includes the read/write transducer. The slider provides mechanical support for the head and the electrical connections between the head and the rest of the data storage system.

When the data storage system is in operation, the slider floats a small distance above the recording medium (e.g., a hard disk in a hard disk drive), which rotates at high speeds. Components of the data storage system move the slider and, therefore, the head to a desired radial position over the surface of the rotating medium, and the head reads or writes information. The slider rides on a cushion or bearing of air or gas created above the surface of the medium as the disk rotates at its operating speed. The slider has an air-bearing surface (ABS) that faces the medium. The ABS is designed to generate an air-bearing force that counteracts a preload bias that pushes the slider toward the medium. The ABS causes the slider to fly above and out of contact with the medium.

To the naked eye, the recording medium surface appears to be smooth, but at the scale of a slider, the surface of the recording medium typically has peaks and valleys. Crown sensitivity is a metric that represents the ability of the slider to follow the topography of the recording medium. Crown sensitivity is typically considered in the design of sliders. A lower crown sensitivity is more desirable than a higher crown sensitivity because it indicates a more compliant air bearing. Likewise, when a change is made to an ABS design, the effect of that change on the crown sensitivity is typically of interest in assessing the compliance of the air bearing. For example, it is generally desirable to avoid developing too much pressure in high-crown areas.

Many data storage devices, such as hard disk drives, are operated in a standard air (e.g., nitrogen, oxygen, and water vapor mixture) atmosphere. Spinning disks in hard disk drives at high revolutions per minute against the friction of an air atmosphere is largely inefficient and requires a certain amount of power. As an alternative, data storage devices, such as hard disk drives, can be filled with a lower-density gas, such as helium, and sealed to control and maintain the device's internal environment, and to prevent the helium from escaping from the interior of the data storage device. Sealing mitigates or prevents leakage of internal gases from within the storage device. The use of helium, which has a density that is approximately one-seventh that of air, reduces friction and vibration in the device, thereby creating less drag and turbulence. Consequently, by running the hard disk drive in a less-dense atmosphere, such as an atmosphere of helium or a helium mixture, friction on the disk is reduced, thereby causing the disk to require less power in order to spin at a similar rate as the disks in drives that operate in standard air conditions. The use of helium also reduces the operating temperature of the drive, as well as noise generated by the drive.

The lower ambient pressure in sealed helium drives poses challenges to data storage devices, however. For example, when operating in helium or a helium mixture, rather than air, the surface of the recording medium can be more susceptible to particle scratches due to reduced particle mobility (because of less pressure gradient and less shear). Particles, lube pick-up, contaminants, and/or smear can build up on the ABS and damage the recording media or cause data stored on the media to be erased. Thus, there is an ongoing need for slider designs that provide improved particle robustness without sacrificing flight characteristics, and without significantly increasing crown sensitivity.

BRIEF DESCRIPTION OF THE DRAWINGS

Objects, features, and advantages of the disclosure will be readily apparent from the following description of certain embodiments taken in conjunction with the accompanying drawings in which.

Figure 1A:
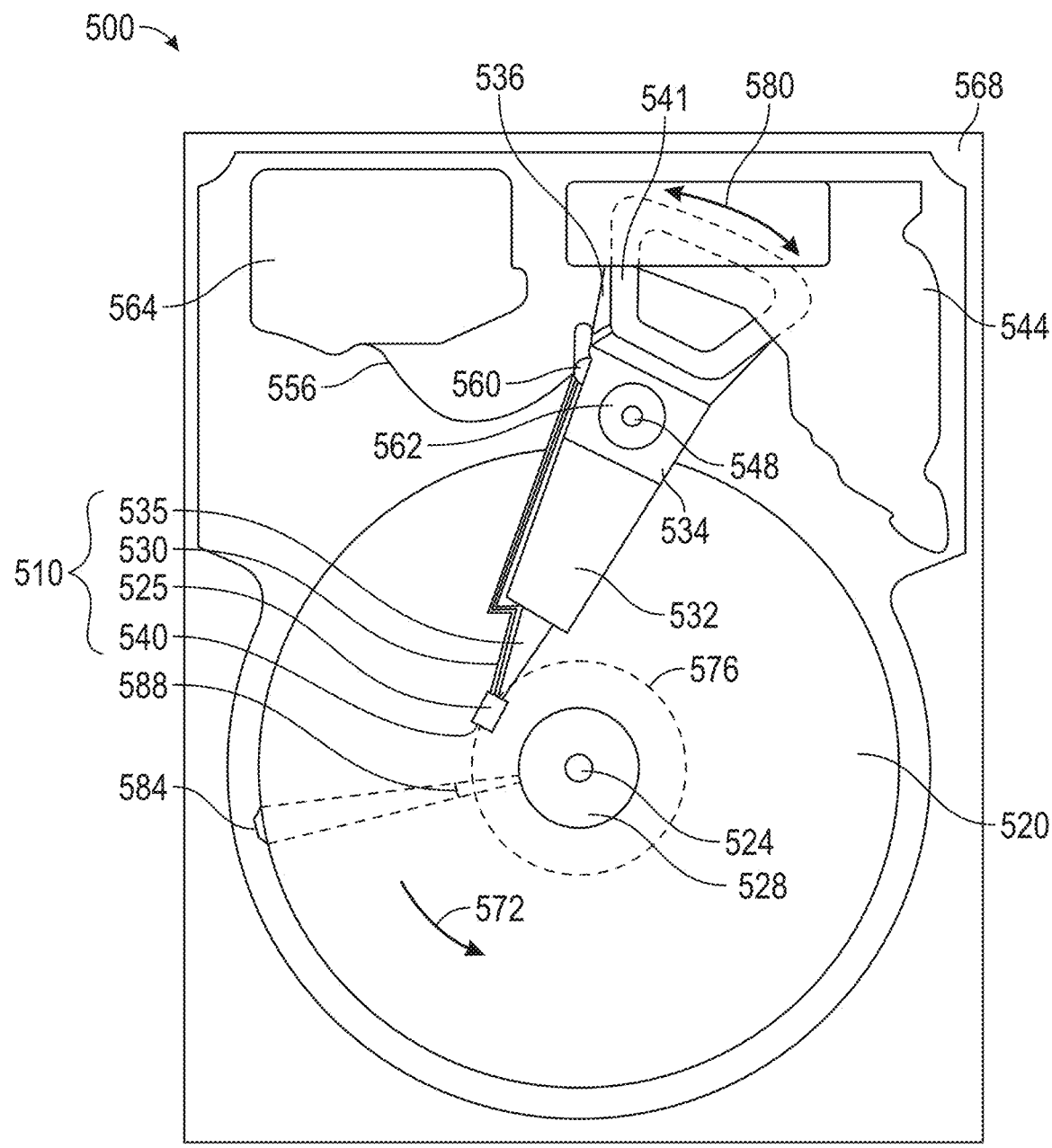
FIG. 1A is a plan view illustrating an example of a data storage device, illustrated as a hard disk drive, that may include one or more of the embodiments disclosed herein.

To facilitate understanding, identical reference numerals have been used, where possible, to designate identical elements that are common to the figures. It is contemplated that elements disclosed in one embodiment may be beneficially utilized in other embodiments without specific recitation. Moreover, the description of an element in the context of one drawing is applicable to other drawings illustrating that element.

DETAILED DESCRIPTION

Disclosed herein are slider air bearing designs that include side blockers to improve robustness to particles. The side blockers are island-type side blockers situated in the mouths of mid-slider cavities of the ABS to block particles that might otherwise enter those cavities, particularly at large skew angles (e.g., when the slider is positioned over the inner diameter or outer diameter of the recording medium) or during loading and unloading. The island design allows air to flow around the side blockers and into the cavities, which results in an ABS design that has higher particle robustness without significantly degrading crown sensitivity or slider flight characteristics (e.g. pressure in the mid-slider cavities).

In some aspects, the techniques described herein relate to a slider, including: a first side-edge surface; a second side-edge surface; and an air-bearing surface (ABS) including: a first side cavity adjacent to the first side-edge surface, and a first island side blocker situated at a mouth of the first side cavity, wherein: a first outer surface of the first island side blocker forms a portion of the first side-edge surface, a second outer surface of the first island side blocker is recessed from the first side-edge surface, a first side opening is situated on a leading side of the first island side blocker, and a second side opening is situated on a trailing side of the first island side blocker.

In some aspects, the techniques described herein relate to a slider, wherein: the ABS includes a plurality of media-facing surfaces at a plurality of levels, the plurality of levels including a first level, a second level, and a third level, each of the plurality of media-facing surfaces being substantially perpendicular to the first side-edge surface and the second side-edge surface, wherein, in an orientation of the slider in which the plurality of media-facing surfaces is oriented upward, the first level is above the second level, and the second level is above the third level; and the first island side blocker includes a first surface at the first level, and a second surface at the second level, wherein the first level is recessed from a top level of the ABS.

In some aspects, the techniques described herein relate to a slider, wherein: the first level is recessed from the top level of the ABS by between about 100 nm and about 200 nm, and the second level is recessed from the first level by between about 300 nm and about 1500 nm.

In some aspects, the techniques described herein relate to a slider, wherein the first island side blocker includes a lower portion and an upper portion, wherein the lower portion includes the first outer surface and the upper portion includes the second outer surface.

In some aspects, the techniques described herein relate to a slider, wherein a length of the lower portion is between about 20 microns and about 200 microns.

In some aspects, the techniques described herein relate to a slider, wherein a width of the lower portion is greater than a width of the upper portion.

In some aspects, the techniques described herein relate to a slider, wherein the width of the lower portion is uniform, and the width of the upper portion is uniform.

In some aspects, the techniques described herein relate to a slider, wherein a shape of the lower portion is cuboid, and a shape of the upper portion is cuboid.

In some aspects, the techniques described herein relate to a slider, wherein a volume of the lower portion is larger than a volume of the upper portion.

In some aspects, the techniques described herein relate to a slider, wherein the upper portion includes a plurality of posts.

In some aspects, the techniques described herein relate to a slider, wherein the plurality of posts includes a first post and a second post, and wherein the first post and the second post are substantially identical.

In some aspects, the techniques described herein relate to a slider, wherein the first post and the second post are substantially cuboid.

In some aspects, the techniques described herein relate to a slider, wherein the plurality of posts includes at least five posts.

In some aspects, the techniques described herein relate to a slider, wherein the ABS further includes: a second side cavity adjacent to the second side-edge surface, and a second island side blocker situated at a mouth of the second side cavity, and wherein: a first outer surface of the second island side blocker forms a portion of the second side-edge surface, a second outer surface of the second island side blocker is recessed from the second side-edge surface, a third side opening is situated on a leading side of the second island side blocker, and a fourth side opening is situated on a trailing side of the second island side blocker.

In some aspects, the techniques described herein relate to a slider, wherein the second island side blocker includes a lower portion and an upper portion, wherein the lower portion includes the first outer surface of the second island side blocker and the upper portion includes the second outer surface of the second island side blocker.

In some aspects, the techniques described herein relate to a slider, wherein a shape of the lower portion is cuboid, and a shape of the upper portion is cuboid.

In some aspects, the techniques described herein relate to a slider, wherein a volume of the lower portion is larger than a volume of the upper portion.

In some aspects, the techniques described herein relate to a slider, wherein the upper portion includes a plurality of posts.

In some aspects, the techniques described herein relate to a slider, wherein the plurality of posts includes a first post and a second post, and wherein the first post and the second post are substantially identical.

In some aspects, the techniques described herein relate to a slider, wherein the first post and the second post are substantially cuboid.

In some aspects, the techniques described herein relate to a slider, wherein the plurality of posts includes at least five posts.

In some aspects, the techniques described herein relate to a data storage device including the slider.

In some aspects, the techniques described herein relate to a slider including an air-bearing surface (ABS), the ABS including: a first side cavity; a first island side blocker situated at a mouth of the first side cavity; a second side cavity; and a second island side blocker situated at a mouth of the second side cavity, wherein: the first island side blocker includes a first lower portion and a first upper portion, wherein the first upper portion is recessed from a first side edge of the slider, and the second island side blocker includes a second lower portion and a second upper portion, wherein the second upper portion is recessed from a second side edge of the slider.

In some aspects, the techniques described herein relate to a slider, wherein the first island side blocker is substantially a translated mirror image of the second island side blocker.

In some aspects, the techniques described herein relate to a slider, wherein the ABS includes a plurality of media-facing surfaces at a plurality of levels, the plurality of levels including a first level, a second level, and a third level, and wherein: the first upper portion includes a first surface at the first level, wherein the first level is recessed from a top level of the ABS, the first lower portion includes a first surface at the second level, the second upper portion includes a second surface at the first level, and the second lower portion includes a second surface at the second level.

In some aspects, the techniques described herein relate to a slider, wherein: a width of the first lower portion is greater than a width of the first upper portion, a width of the second lower portion is greater than a width of the second upper portion, the width of the first lower portion is approximately equal to the width of the second lower portion, and the width of the first upper portion is approximately equal to the width of the second upper portion.

In some aspects, the techniques described herein relate to a slider, wherein: the width of the first lower portion is uniform, the width of the first upper portion is uniform, the width of the second lower portion is uniform, and the width of the second upper portion is uniform.

In some aspects, the techniques described herein relate to a slider, wherein each of the first lower portion, the first upper portion, the second lower portion, and the second upper portion is cuboid.

In some aspects, the techniques described herein relate to a slider, wherein: the first upper portion is segmented, the first lower portion is non-segmented, the second upper portion is segmented, and the second lower portion is non-segmented.

In some aspects, the techniques described herein relate to a slider, wherein each of the first upper portion and the second upper portion includes at least three segments.

In some aspects, the techniques described herein relate to a slider, wherein: a first segment of the first upper portion is substantially identical to a second segment of the first upper portion, and a first segment of the second upper portion is substantially identical to a second segment of the second upper portion.

In some aspects, the techniques described herein relate to a data storage device including the slider.

FIG. 1A is a plan view illustrating an example of a data storage device 500, illustrated as a hard disk drive, that may include one or more of the embodiments disclosed herein. FIG. 1A illustrates an example of the functional arrangement of components of the data storage device 500, including a slider 525 that includes a recording head 540. The recording head 540 (which may also be referred to as a transducer or a read/write transducer) includes a write element and a read element for respectively writing information to and reading information from a recording medium 520 of the data storage device 500. The data storage device 500 includes at least one head gimbal assembly (HGA) 510, which includes the slider 525, a suspension and actuator arm 530 attached to the slider 525, and a load beam 535 attached to the suspension and actuator arm 530. The data storage device 500 also includes at least one recording medium 520, which may be, for example, a magnetic recording medium, rotatably mounted on a spindle 524, and a drive motor (not shown) attached to the spindle 524 for rotating the recording medium 520. The recording medium 520, which may include a plurality of disks, may be affixed to the spindle 524 with a disk clamp 528.

The data storage device 500 further includes an arm 532 attached to the HGA 510, a carriage 534, a voice-coil motor (VCM) that includes an armature 536 including a voice coil 541 attached to the carriage 534, and a stator 544 including a voice-coil magnet. The armature 536 of the VCM is attached to the carriage 534 and is configured to move the arm 532 and the HGA 510 to access portions of the recording medium 520. The carriage 534 is mounted on a pivot-shaft 548 with an interposed pivot-bearing assembly 562. In the case of an HDD having multiple disks (also sometimes referred to as "platters"), the carriage 534 may be called an "E-block," or comb, because the carriage 534 is arranged to carry a ganged array of arms (multiple instances of the arm 532) that gives it the appearance of a comb.

An assembly comprising a head gimbal assembly (e.g., HGA 510), including a suspension flexure to which the slider 525 is coupled, an actuator arm (e.g., the arm 532) to which the suspension is coupled, and an actuator (e.g., the VCM) to which the actuator arm is coupled, may be collectively referred to as a head stack assembly (HSA). The HSA also includes a suspension tail. Generally, the HSA is the assembly configured to move the slider 525 to enable the recording head 540 to access portions of the recording medium 520 (e.g., magnetic-recording disks) for read and write operations.

In the example data storage device 500 shown in FIG. 1A, electrical signals (for example, current to the voice coil 541 of the VCM, write signals to and read signals from the recording head 540, etc.) are provided by a flexible interconnect cable 556 (which may be referred to as a "flex cable"). Interconnection between the flex cable 556 and the recording head 540 may be provided by an arm-electronics (AE) module 560, which may have an on-board pre-amplifier for the read signal, as well as other read-channel and write-channel electronic components. The AE module 560 may be attached to the carriage 534 as shown. The flex cable 556 is coupled to an electrical-connector block 564, which provides electrical communication through electrical feedthroughs provided by a data storage device housing 568. The data storage device housing 568, in conjunction with a cover (not shown), provides a sealed, protective enclosure for the information storage components of the data storage device 500.

Other electronic components, including a disk controller and servo electronics such as a digital-signal processor (DSP), can be included in the data storage device 500 to provide electrical signals to the drive motor, the voice coil 541 of the VCM, and the recording head 540 of the HGA 510. The electrical signal provided to the drive motor enables the drive motor to spin, thereby providing a torque to the spindle 524, which is in turn transmitted to the recording medium 520 that is affixed to the spindle 524 by the disk clamp 528; as a result, the recording medium 520 spins in a direction 572. Because it is spinning, the recording medium 520 creates a cushion of air that acts as an air-bearing on which the air-bearing surface (ABS) of the slider 525 rides so that the slider 525 flies above the surface of the recording medium 520 without making contact with a thin magnetic-recording layer of the recording medium 520 in which information is recorded.

The electrical signal provided to the voice coil 541 of the VCM enables the recording head 540 of the HGA 510 to access a track 576 on which information is recorded. Thus, the armature 536 of the VCM swings through an arc 580, which allows the HGA 510 attached to the armature 536 by the arm 532 to access various tracks on the recording medium 520. Information is stored on the recording medium 520 in a plurality of sectored tracks arranged in sectors on the recording medium 520, for example, sector 584. Correspondingly, each track is composed of a plurality of sectored track portions, for example, the sectored track portion 588. Each sectored track portion 588 includes recorded data and a header containing a servo-burst-signal pattern, for example, an ABCD-servo-burst-signal pattern, information that identifies the track 576, and error correction code information. In accessing the track 576, the read element of the recording head 540 of the HGA 510 reads the servo-burst-signal pattern, which provides a position-error-signal (PES) to the servo electronics, which controls the electrical signal provided to the voice coil 541 of the VCM, enabling the recording head 540 to follow the track 576. Upon finding the track 576 and identifying a particular sectored track portion 588, the recording head 540 either reads data from the track 576 or writes data to the track 576, depending on instructions received by the disk controller from an external agent, for example, a microprocessor of a computer system to which the data storage device 500 is connected.

For reading the information stored on the recording medium 520, the recording head 540 may include only one read sensor, or it may include multiple read sensors. The read sensor(s) in the recording head 540 may include, for example, one or more giant magnetoresistance (GMR) sensors, tunneling magnetoresistance (TMR) sensors, or another type of magnetoresistive sensor. When the slider 525 passes over a track 576 on the recording medium 520, the recording head 540 detects changes in resistance due to magnetic field variations recorded on the recording medium 520, which represent the recorded bits.

The data storage device 500 may be what is at times referred to as a "hybrid drive." A hybrid drive refers generally to a storage device having functionality of both a traditional hard disk drive (HDD) combined with a solid-state storage device (SSD) using non-volatile memory, such as flash or other solid-state (e.g., integrated circuits) memory, which is electrically erasable and programmable. Because operation, management, and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Furthermore, a hybrid drive may be architected and configured essentially as two storage devices in a single enclosure, e.g., a traditional HDD and a SSD, with either one or multiple interfaces for host connection.

Figure 1B:
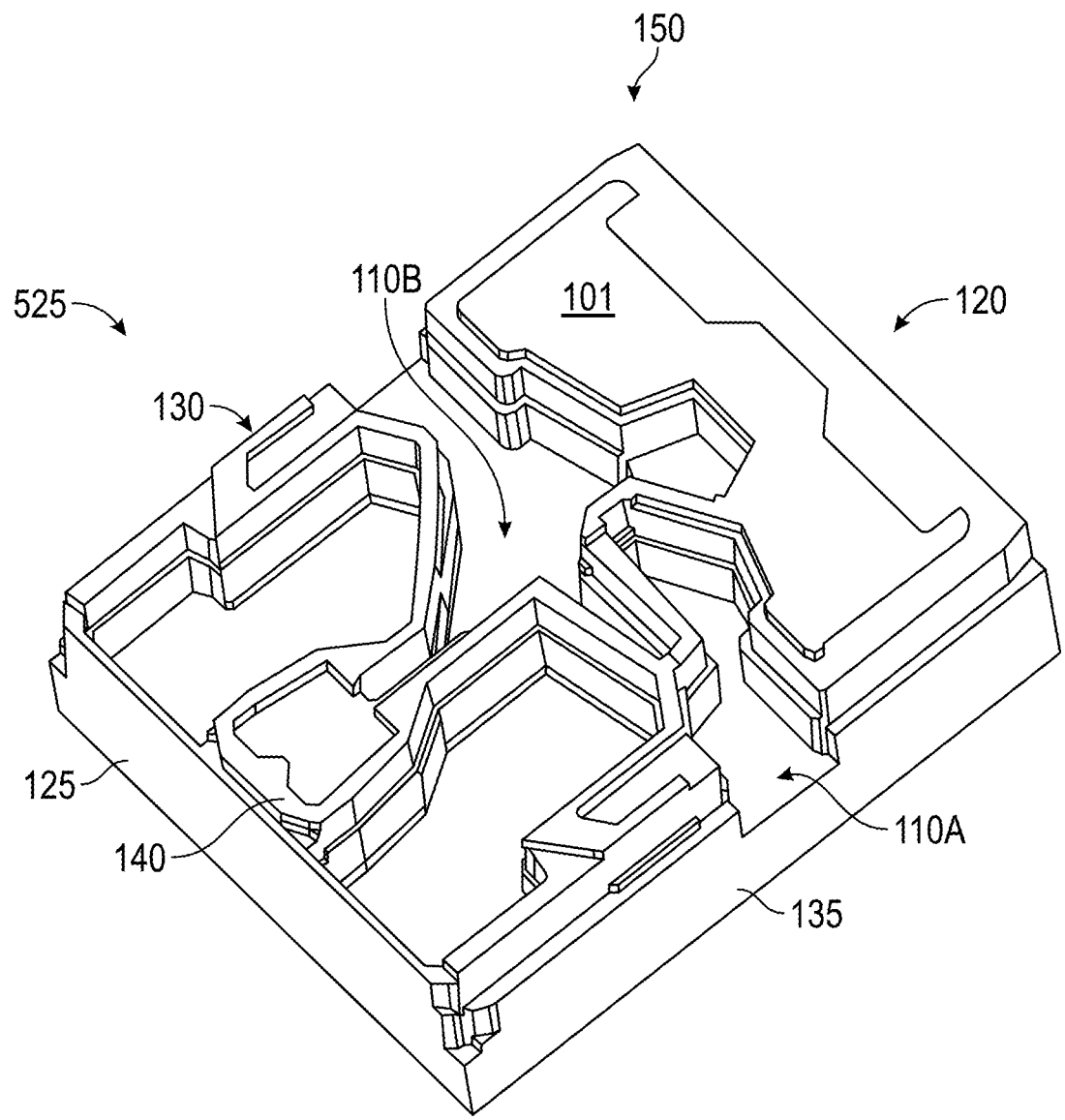
FIG. 1B illustrates a conventional slider without the island-type side blockers disclosed herein.

FIG. 1B is a perspective view of a conventional slider 525. The slider 525 has a leading-edge surface 120, a trailing-edge surface 125, an outer-diameter edge 135 extending between the leading-edge surface 120 and the trailing-edge surface 125, and an inner-diameter edge 130 that also extends between the leading-edge surface 120 and the trailing-edge surface 125. The slider 525 also has an ABS 150, which includes, among other things, two mid-slider cavities, namely, an outer-diameter side cavity 110A and an inner-diameter side cavity 110B. The outer-diameter side cavity 110A and inner-diameter side cavity 110B increase the stability of the slider 525 by encouraging air (or gas) flow in to the outer-diameter side cavity 110A and inner-diameter side cavity 110B, particularly at large skew angles, discussed further below. The slider 525 also has a trailing edge pad 140, which is where the read/write transducer resides.

Figure 1C:
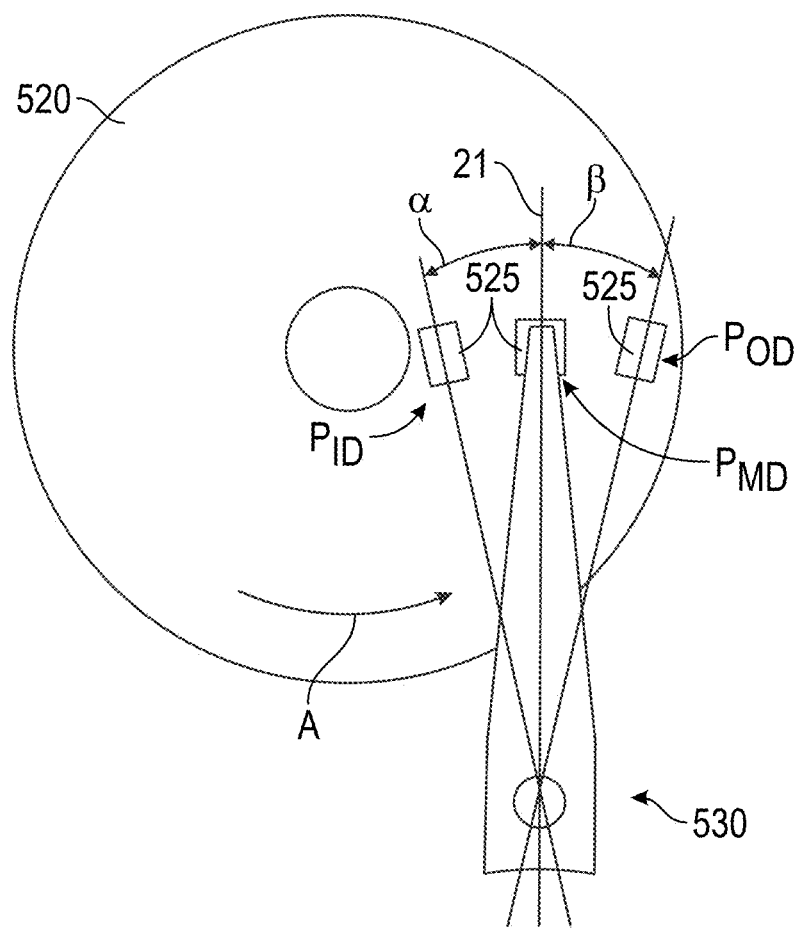
FIG. 1C is a diagram showing skew angles of a slider at different positions with respect to the recording medium.

FIG. 1C is a diagram of a slider 525 over a recording medium 520 to illustrate skew angles of the slider 525 at different positions with respect to the recording medium 520. The suspension and actuator arm 530 supports the slider 525 above the surface of the recording medium 520 at locations including an inner diameter (ID) position $P_{ID}$, an outer diameter (OD) position $P_{OD}$, and positions between $P_{ID}$ and $P_{OD}$, including the mid-disk (MD) position $P_{MD}$. As the recording medium 520 spins, it produces airflow in a direction tangential to the recording medium 520 in the direction the recording medium 520 spins, as shown by the arrow A. When the slider 525 is at the mid-disk position $P_{MD}$, the centerline 21 of the slider 525 is approximately aligned with the direction of the airflow produced by the recording medium 520. In this case, the skew angle is 0 (zero). When the slider 525 is at other positions over the recording medium 520, however, the centerline 21 of the slider 525 is not aligned with the direction of the airflow produced by the recording medium 520. The angle of misalignment of the direction of the airflow and the centerline 21 of the slider 525 is known as the skew angle. The skew angle affects the aerodynamic characteristics of the slider ABS and particle robustness of the slider 525 at different positions over the recording medium 520. Generally, the greater the skew angle, the lower the lift produced for a given airflow velocity. Moreover, greater skew angles result in a higher likelihood of particles entering the outer-diameter side cavity 110A and the inner-diameter side cavity 110B, which can have mouths (openings) at the outer-diameter edge 135 and the inner-diameter edge 130 of, for example, around 3 microns. As shown in FIG. 1C, when the slider 525 is at the ID position $P_{ID}$, the skew angle is α, which is the maximum skew angle in the ID direction. When the slider 525 is at the OD position $P_{OD}$, the skew angle is β, which is the maximum skew angle in the OD direction.

When the slider 525 skew angle is nonzero, unwanted particles can enter the outer-diameter side cavity 110A and/or the inner-diameter side cavity 110B along with desired airflow. This problem can be particularly acute when the slider 525 is at the ID position $P_{ID}$ and when the slider 525 is at the OD position $P_{OD}$. Particles, lube pick-up, contaminants, and/or smear can build up on the ABS 150 and damage the recording media and head sensors, thereby causing data stored on the media to be erased. Accordingly, there is a need for new ABS 150 designs that can block particles before they enter the outer-diameter side cavity 110A and/or the inner-diameter side cavity 110B without significantly impairing the function of the outer-diameter side cavity 110A and the inner-diameter side cavity 110B. In particular there is a need for slider designs that provide improved particle robustness without sacrificing flight characteristics (e.g., slider stability), and without significantly increasing crown sensitivity.

Disclosed herein are island-type side blockers configured to reduce or eliminate at least some of the particles that would otherwise enter the outer-diameter side cavity 110A and inner-diameter side cavity 110B while still allowing sufficient airflow (or gas flow) into the outer-diameter side cavity 110A and inner-diameter side cavity 110B. The disclosed island-type side blockers are of sizes and shapes that prevent larger particles from entering the outer-diameter side cavity 110A and inner-diameter side cavity 110B while allowing pressurization to flow past, thereby acting as "dummy" features with respect to ABS 150 pressurization. Thus, the disclosed island-type side blockers are able to block particles without dramatically changing the pressurization.

Figure 2A:
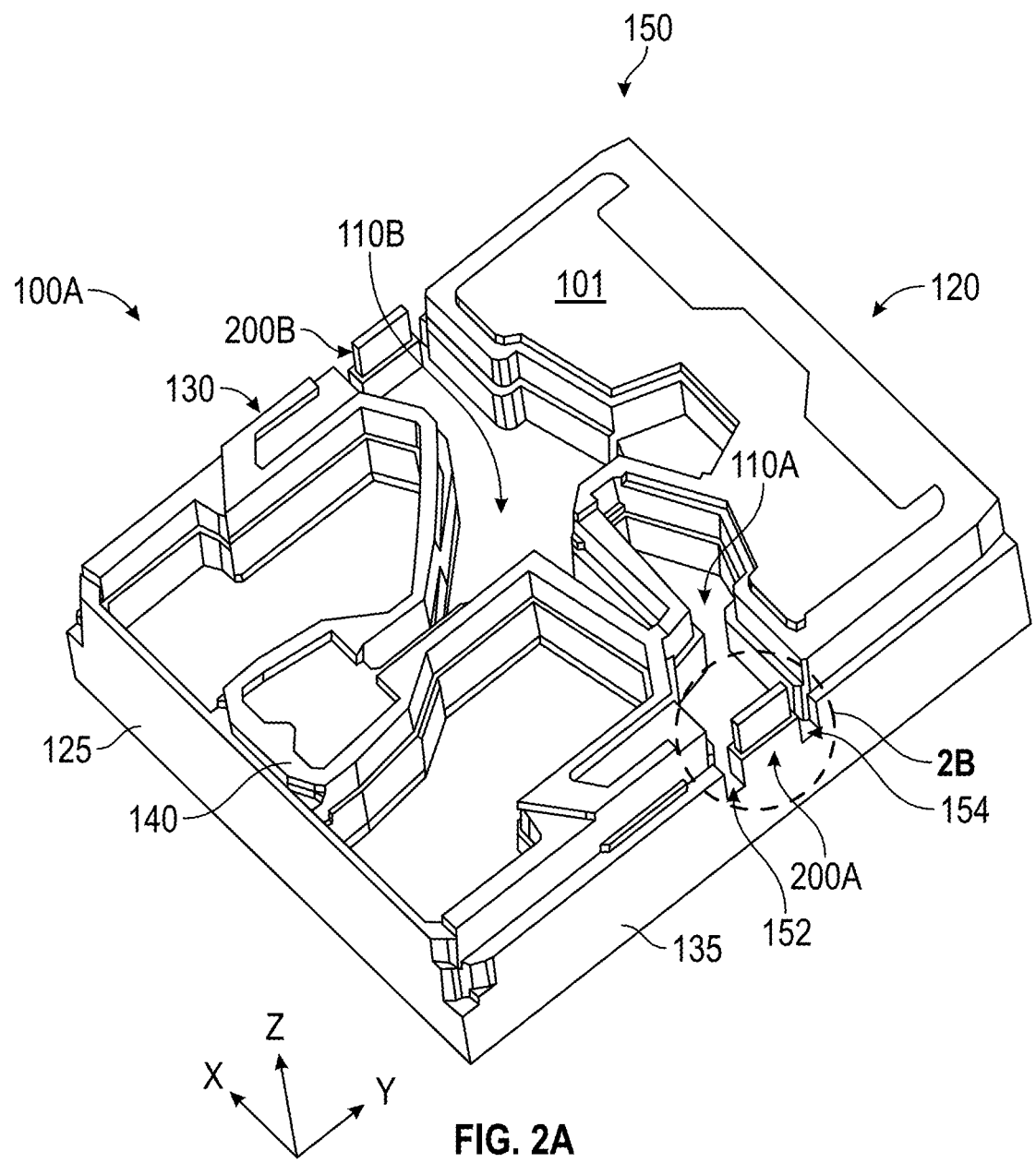
FIG. 2A is a perspective view of an example of a slider with island side blockers in accordance with some embodiments.

FIG. 2A is a perspective view of an example of a slider 100A with one style of island side blockers in accordance with some embodiments. The slider 100A may be incorporated in a data storage device 500. FIG. 2A includes example x, y, and z axes that are used herein to describe the slider 100A and its features. Using the illustrated axes, the leading-edge surface 120 and trailing-edge surface 125 extend in x-z planes, and the inner-diameter edge 130 and outer-diameter edge 135 extend in y-z planes. Accordingly, the leading-edge surface 120 and trailing-edge surface 125 are substantially perpendicular to the inner-diameter edge 130 and outer-diameter edge 135.

The ABS 150 of the slider 100A has surfaces at various heights along the z-axis. In particular, the ABS 150 of the slider 100A has a plurality of media-facing surfaces at a plurality of levels along the z-axis. In the example shown in FIG. 2A, the ABS 150 has media-facing surfaces at four levels (described further below in the discussions of FIGS. 2B, 2C, 2D, and 2E). Each surface of the plurality of media-facing surfaces is substantially perpendicular to the inner-diameter edge 130 and the outer-diameter edge 135. FIG. 2A labels a surface 101 at a particular level that, when the slider 100A is in an orientation in which the plurality of media-facing surfaces face upward, is at the top (or uppermost) level. Ignoring that the slider 100A flies at an angle to the recording medium 520, surfaces at the top level (including the labeled surface 101) are closest to the recording medium 520 when the slider 100A is installed in a data storage device 500.

The ABS 150 of the slider 100A example of FIG. 2A includes an outer-diameter island side blocker 200A and an inner-diameter island side blocker 200B. In the example shown in FIG. 2A, the outer-diameter island side blocker 200A and the inner-diameter island side blocker 200B are mirror images of each other. In other words, the inner-diameter island side blocker 200B is identical to the outer-diameter island side blocker 200A, but rotated by 180 degrees (about the z-axis) relative to the outer-diameter island side blocker 200A. Thus, the inner-diameter island side blocker 200B is a rotation about the z-axis and a translation in the x-direction of the outer-diameter island side blocker 200A.

In some embodiments, the inner-diameter island side blocker 200B is a translation of the outer-diameter island side blocker 200A. In other words, the inner-diameter island side blocker 200B is substantially identical to the outer-diameter island side blocker 200A and is merely translated in the x-direction to the inner-diameter edge 130 and the inner-diameter side cavity 110B. It will be appreciated that when the outer-diameter island side blocker 200A is symmetrical about its middle x-z and y-z planes (as the outer-diameter island side blocker 200A shown in FIG. 2A is), a 180 degree rotation about the z-axis plus translation along the x-direction results in the same inner-diameter island side blocker 200B as only the translation. In other words, a translation of the outer-diameter island side blocker 200A results in the same inner-diameter island side blocker 200B as a translation and a 180 degree rotation.

There is no requirement for the outer-diameter island side blocker 200A and the inner-diameter island side blocker 200B to be related to each other (e.g., as mirror images or translations). In some embodiments, the sizes, shapes, volumes, etc. of the outer-diameter island side blocker 200A and the inner-diameter island side blocker 200B are different from each other. It is also not necessary to include both the outer-diameter island side blocker 200A and the inner-diameter island side blocker 200B in an ABS 150. For example, referring back to FIG. 1C, if the skew angle at the inner diameter were zero, the inner-diameter island side blocker 200B could be eliminated. Similarly, if the skew angle at the outer diameter were zero, the outer-diameter island side blocker 200A could be eliminated.

Figure 2B:
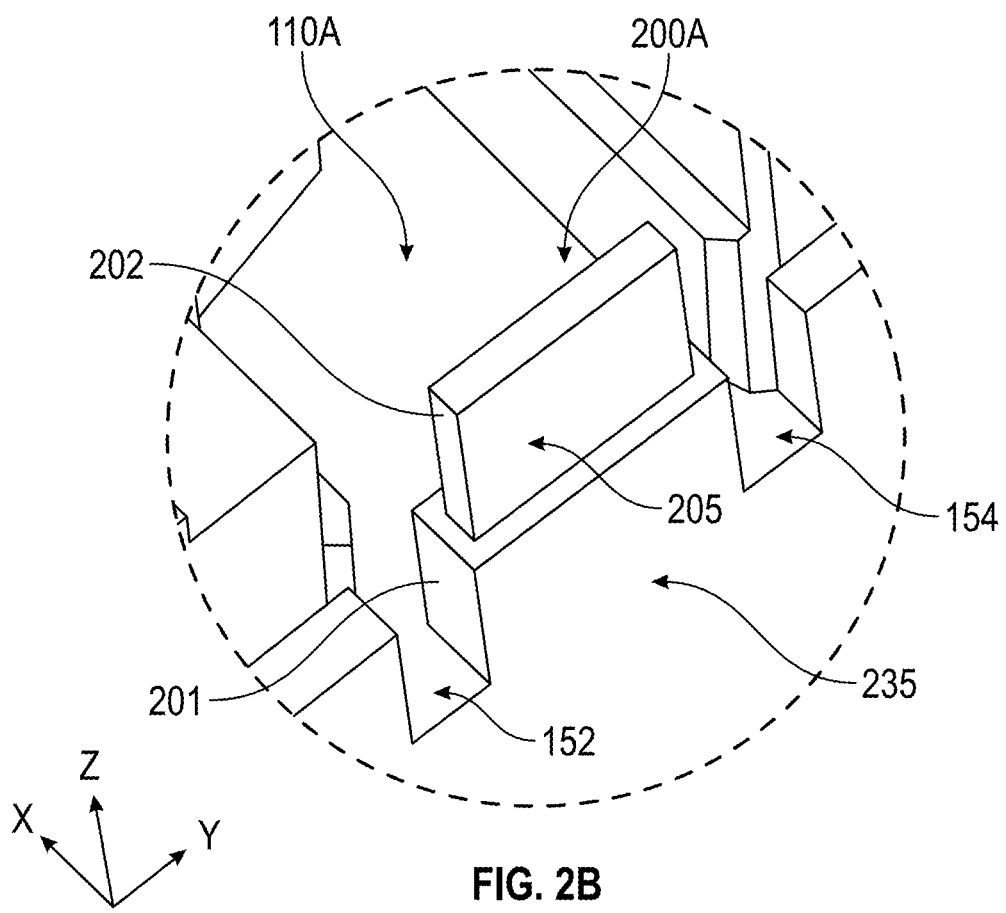
FIG. 2B is a closer perspective view of the outer-diameter island side blocker shown in FIG. 2A.

FIG. 2B is a closer perspective view of the outer-diameter island side blocker 200A example shown in FIG. 2A. As explained above, the inner-diameter island side blocker 200B can be substantially identical to the outer-diameter island side blocker 200A but translated in the x-direction and/or rotated about the z-axis. For example, the inner-diameter island side blocker 200B can be structurally substantially identical to the outer-diameter island side blocker 200A but rotated by 180 degrees and translated to the mouth of the inner-diameter side cavity 110B (e.g., a mirror image).

As shown in FIG. 2B, the example of the outer-diameter island side blocker 200A includes a lower portion 201 and an upper portion 202. The lower portion 201 has an outer surface 235, which forms a portion of the outer-diameter edge 135 of the slider 100A. The upper portion 202 includes an outer surface 205 that is recessed from the outer-diameter edge 135 of the slider 100A. The outer surface 205 being recessed can be advantageous to allow edge quality to be maintained during manufacturing. In particular, in some manufacturing processes, the inner-diameter edge 130 and outer-diameter edge 135 may be created in a machine cut step, which, as will be appreciated by those having ordinary skill in the art, can result in the surfaces of the inner-diameter edge 130 and outer-diameter edge 135 being somewhat ragged when compared to other surfaces of the slider 100A that are created by other manufacturing steps (e.g., the leading-edge surface 120, the trailing-edge surface 125, and the ABS 150 surfaces). The outermost portions of the inner-diameter edge 130 and outer-diameter edge 135 can therefore attract particles, lube, etc. If the outer surface 205 were created using the same manufacturing process as is used to create the outer-diameter edge 135 (e.g., if it were not recessed from the outer-diameter edge 135), this non-recessed outer surface would have the same raggedness as the outer-diameter edge 135 and could, like the outer-diameter edge 135, attract particles. Because of the proximity of the outer-diameter island side blocker 200A to the surface of the recording medium 520 when the slider 100A flies, particles collected on a non-recessed outer surface could come into contact with the recording medium 520 as the slider 100A flies over it and rolls from side to side, thereby potentially causing damage or data loss. Therefore, one benefit of the outer surface 205 being recessed from the outer-diameter edge 135 is that the outer surface 205 can be made smoother than the surface of the outer-diameter edge 135 by other manufacturing steps (e.g., ion milling) and thereby reduce the likelihood of particles sticking to the outer surface 205 and causing damage to the recording medium 520 as the slider 100A rolls from side to side while flying. As a result, the ragged portion of the outer-diameter edge 135 remains further away from the recording medium 520 as the slider 100A flies, and the smoother outer surface 205 of the outer-diameter island side blocker 200A is able to block but not collect particles that might otherwise enter the outer-diameter side cavity 110A. Both of the lower portion 201 and the upper portion 202 of the outer-diameter island side blocker 200A example shown in FIG. 2B have cuboid shapes. In the example of FIG. 2B, the lower portion 201 has a larger volume than the upper portion 202, but there is no requirement for the lower portion 201 to have a larger volume than the upper portion 202.

The outer-diameter island side blocker 200A is situated between two side openings. A first side opening 154 is situated on the leading side of the outer-diameter island side blocker 200A (i.e., the side of the outer-diameter island side blocker 200A that is toward the leading-edge surface 120 of the slider 100A). A second side opening 152 is situated on the trailing side of the outer-diameter island side blocker 200A (i.e., on the side of the outer-diameter island side blocker 200A that is toward the trailing-edge surface 125 of the slider 100A).

Figure 2C:
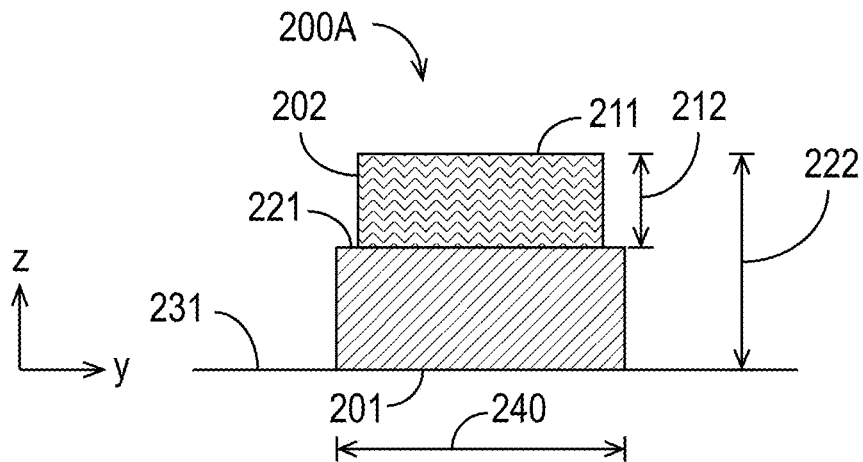
FIG. 2C is a view of the outer-diameter island side blocker as seen from beyond the outer-diameter edge.
Figure 2D:
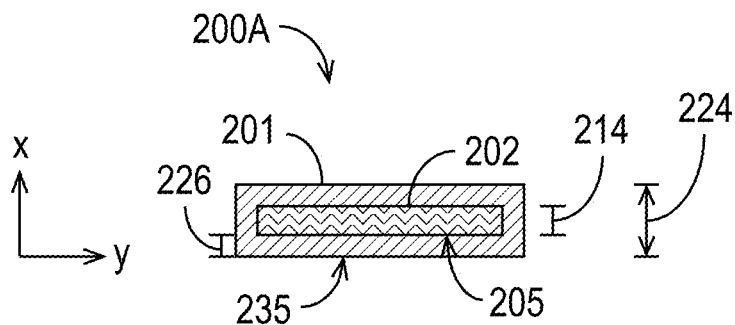
FIG. 2D is an ABS view of the outer-diameter island side blocker.
Figure 2E:
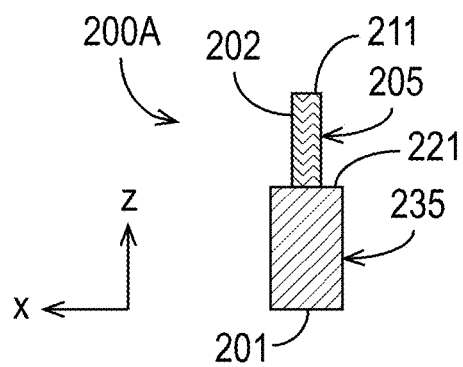
FIG. 2E is an end view of the outer-diameter island side blocker.

FIG. 2C is a view of the outer-diameter island side blocker 200A as seen from beyond the outer-diameter edge 135 of the slider 100A. FIG. 2D is an ABS view of the outer-diameter island side blocker 200A. FIG. 2E is an end view of the outer-diameter island side blocker 200A from the trailing side. As shown in FIGS. 2C, 2D, and 2E, the outer-diameter island side blocker 200A has a surface at a first level 211 and a surface at a second level 221. The surface at the first level 211 is the top surface of the upper portion 202, and the surface at the second level 221 is the top surface of the lower portion 201.

The surface at the first level 211 is recessed from the surfaces at the top level of the ABS 150 described above (e.g., surfaces at the same level as the surface 101). The surface at the second level 221 is recessed from the surface at the first level 211 by a distance 212. The base of the outer-diameter island side blocker 200A is at a third level 231, which is also the level of the outer-diameter side cavity 110A. The surface at the third level 231 is recessed from the surface at the first level 211 by a distance 222. Thus, the outer-diameter island side blocker 200A comprises a first surface at the first level 211 and a second surface at the second level 221.

In an orientation of the slider in which the plurality of media-facing surfaces is oriented upward, the surface at the first level 211 is above the surface at the second level 221, and the surface at the second level 221 is above the surface at the third level 231. All of the surface at the first level 211, surface at the second level 221, and surface at the third level 231 are below the surfaces at the top (uppermost) level of the ABS 150 (assuming the ABS 150 is oriented upward). The surface at the first level 211 may be recessed from surfaces at the top level of the ABS 150 by between about 100 nm and about 200 nm, and the surface at the second level 221 may be recessed from the surface at the first level 211 by between about 300 nm and about 1500 nm.

As explained above, in the example illustrated in FIGS. 2A through 2E, the outer-diameter island side blocker 200A comprises the lower portion 201 and the upper portion 201, both of which are cuboid. Accordingly, because they are cuboid, the lower portion 201 and the upper portion 202 both have uniform widths in the x-direction and uniform lengths in the y-direction. The length 240 of the lower portion 201 may be, for example, between about 20 microns and about 200 microns. The lower portion 201 has a width 224, and the upper portion 202 has a width 214. The uniform width 214 of the upper portion 202 and uniform width 224 of the lower portion 201 are advantageous because they cause less degradation to crown sensitivity than other shapes (e.g., a prism oriented on its end). Similarly, it is advantageous to keep the width 214 and width 224 thin (e.g., around 15 microns) to mitigate degradations to crown sensitivity.

In the example shown in FIGS. 2A through 2E, the width 224 is greater than the width 214, but this is not a requirement. FIG. 2D also illustrates that the outer surface 205 of the upper portion 202 is recessed from the outer surface 235 of the lower portion 201, and, therefore, from the outer-diameter edge 135 of the slider 100A, by a distance 226.

Although FIG. 2A shows an example of a slider 100A that has two side blockers, namely the outer-diameter island side blocker 200A and the inner-diameter island side blocker 200B, as explained above, it is to be appreciated that a slider can include only one side blocker (e.g., only outer-diameter island side blocker 200A or inner-diameter island side blocker 200B). Similarly, although FIG. 2A illustrates an outer-diameter island side blocker 200A and an inner-diameter island side blocker 200B that are substantially identical (translated and perhaps rotated), it is to be appreciated that the outer-diameter island side blocker 200A and the inner-diameter island side blocker 200B can be different from each other in size, shape, etc.

Figure 3A:
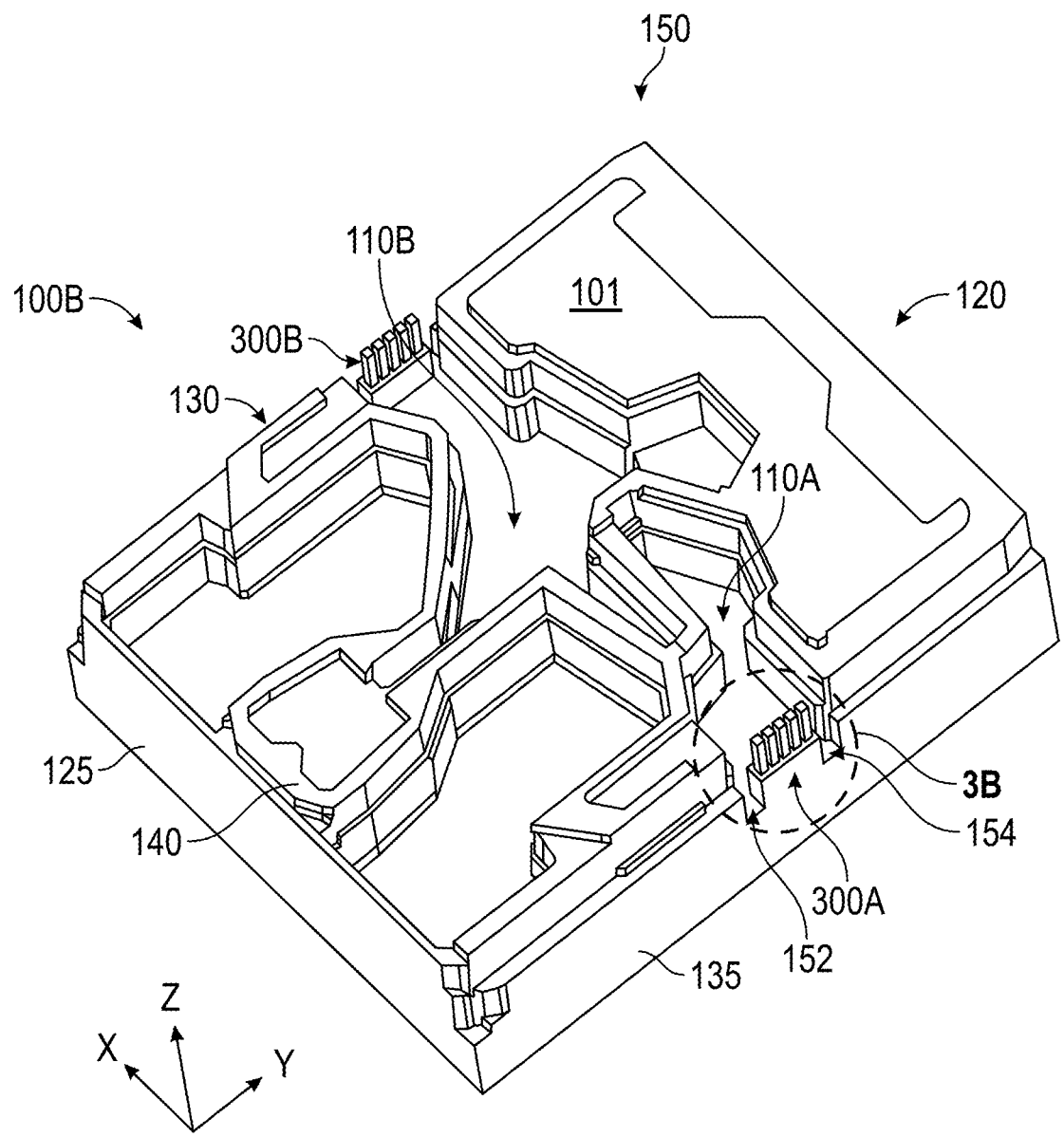
FIG. 3A is a perspective view of another example of a slider with island side blockers in accordance with some embodiments.

FIG. 3A is a perspective view of another example of a slider 100B with another style of island side blockers in accordance with some embodiments. The slider 100B may be incorporated into a data storage device 500. FIG. 3A includes the same example x, y, and z axes as in FIG. 2A. As in the case of the slider 100A, the leading-edge surface 120 and trailing-edge surface 125 of the slider 100B are substantially perpendicular to the inner-diameter edge 130 and outer-diameter edge 135.

Like the ABS 150 of the slider 100A shown in FIG. 2A, the ABS 150 of the slider 100B in FIG. 3A has surfaces at various heights along the z-axis. In particular, the ABS 150 of the slider 100B has a plurality of media-facing surfaces at a plurality of levels along the z-axis. In the example shown in FIG. 3A, the ABS 150 has media-facing surfaces at the four levels described above in the discussion of FIGS. 2A through 2E. That discussion applies here and is not repeated.

The ABS 150 of the slider 100B example of FIG. 3A includes an segmented outer-diameter island side blocker 300A and an segmented inner-diameter island side blocker 300B, both of which may be referred to as a segmented side blockers. In the example shown in FIG. 3A, the segmented outer-diameter island side blocker 300A and the segmented inner-diameter island side blocker 300B are mirror images of each other. In other words, the segmented inner-diameter island side blocker 300B is substantially identical to the segmented outer-diameter island side blocker 300A, but rotated by 180 degrees (about the z-axis) relative to the segmented outer-diameter island side blocker 300A. Thus, the segmented inner-diameter island side blocker 300B is a rotation about the z-axis and a translation in the x-direction of the outer-diameter island side blocker 200A.

As explained above in the discussion of the outer-diameter island side blocker 200A and inner-diameter island side blocker 200B examples in FIGS. 2A through 2E, the segmented outer-diameter island side blocker 300A and segmented inner-diameter island side blocker 300B can be identical but rotated and/or translated with respect to each other. In some embodiments, the segmented inner-diameter island side blocker 300B is a translation of the segmented outer-diameter island side blocker 300A. In other words, the segmented inner-diameter island side blocker 300B is substantially identical to the segmented outer-diameter island side blocker 300A and is merely translated in the x-direction to the inner-diameter edge 130 and the inner-diameter side cavity 110B. It will be appreciated that when the segmented outer-diameter island side blocker 300A is symmetrical about its middle x-z and y-z planes (as the segmented outer-diameter island side blocker 300A shown in FIG. 3A is), a 180 degree rotation about the z-axis plus translation along the x-direction results in the same segmented inner-diameter island side blocker 300B as only the translation. In other words, a translation of the segmented outer-diameter island side blocker 300A results in the same segmented inner-diameter island side blocker 300B as a translation and a 180 degree rotation.

There is no requirement for the segmented outer-diameter island side blocker 300A and the segmented inner-diameter island side blocker 300B to be related to each other (e.g., as mirror images or translations). In some embodiments, the sizes, shapes, volumes, etc. of the segmented outer-diameter island side blocker 300A and the segmented inner-diameter island side blocker 300B are different from each other. It is also not necessary to include both the segmented outer-diameter island side blocker 300A and the segmented inner-diameter island side blocker 300B in an ABS 150. For example, referring back to FIG. 1C, if the skew angle at the inner diameter were zero, the segmented inner-diameter island side blocker 300B could be eliminated. Similarly, if the skew angle at the outer diameter were zero, the segmented outer-diameter island side blocker 300A could be eliminated.

Figure 3B:
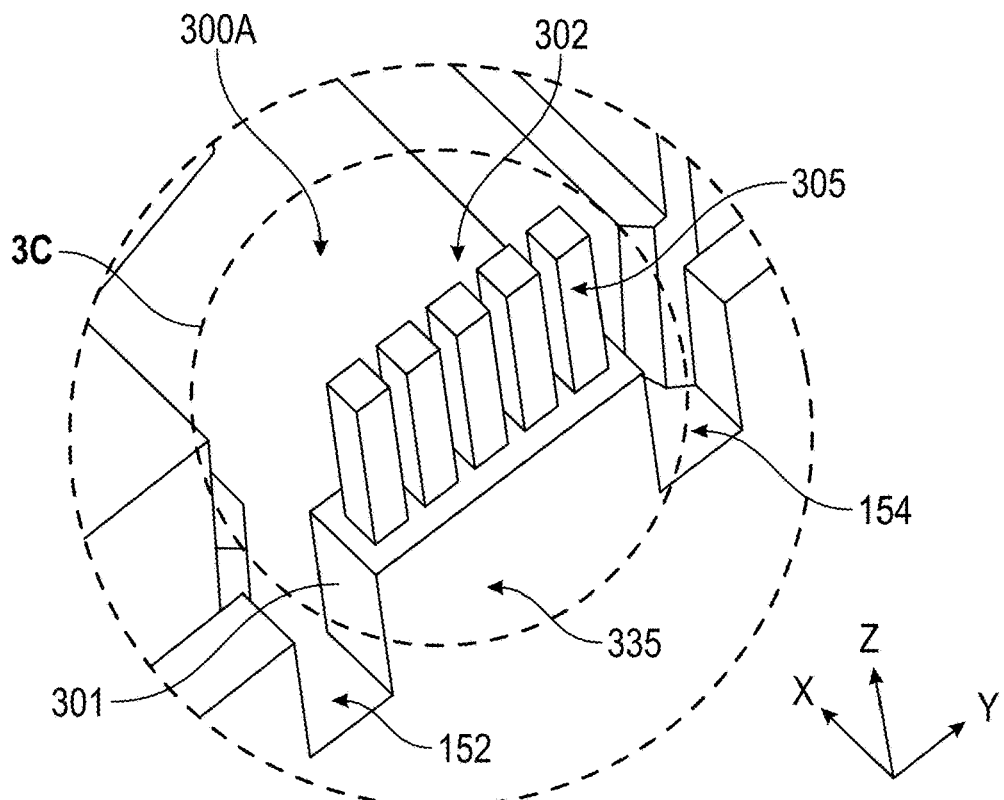
FIG. 3B is a closer perspective view of the outer-diameter island side blocker shown in FIG. 3A.

FIG. 3B is a closer perspective view of the segmented outer-diameter island side blocker 300A example shown in FIG. 3A. As explained above, the segmented inner-diameter island side blocker 300B can be substantially identical to the segmented outer-diameter island side blocker 300A but translated in the x-direction and/or rotated about the z-axis. For example, the segmented inner-diameter island side blocker 300B can be structurally substantially identical to the segmented outer-diameter island side blocker 300A but rotated by 180 degrees and translated to the mouth of the inner-diameter side cavity 110B (e.g., a mirror image).

As shown in FIG. 3B, the example of the segmented outer-diameter island side blocker 300A includes a lower portion 301 and an upper portion 302. In the example illustrated, the lower portion 301 of the segmented outer-diameter island side blocker 300A is non-segmented, and it has a cuboid shape. The lower portion 301 has an outer surface 335, which forms a portion of the outer-diameter edge 135 of the slider 100B. The lower portion 301 can be substantially similar or identical to the lower portion 201 described and shown in the context of FIGS. 2A through 2E.

The upper portion 302 of the example segmented outer-diameter island side blocker 300A shown in FIG. 3B is segmented and comprises a plurality of posts (which can also be referred to as segments), described further below. In the example, each of the plurality of posts in the upper portion 302 has an outer surface 305 that is recessed from the outer surface 335 of the lower portion 301 and, therefore, from the outer-diameter edge 135 of the slider 100B. (To avoid obscuring the drawing, only one outer surface 305 is labeled in FIG. 3B.) As explained above, the outer surfaces 305 being recessed can be advantageous to allow edge quality to be maintained during manufacturing.

As shown in FIG. 3B, the segmented outer-diameter island side blocker 300A is situated between two side openings. A first side opening 154 is situated on the leading side of the segmented outer-diameter island side blocker 300A (i.e., the side of the segmented outer-diameter island side blocker 300A that is toward the leading-edge surface 120 of the slider 100B). A second side opening 152 is situated on the trailing side of the segmented outer-diameter island side blocker 300A (i.e., on the side of the segmented outer-diameter island side blocker 300A that is toward the trailing-edge surface 125 of the slider 100B).

Figure 3C:
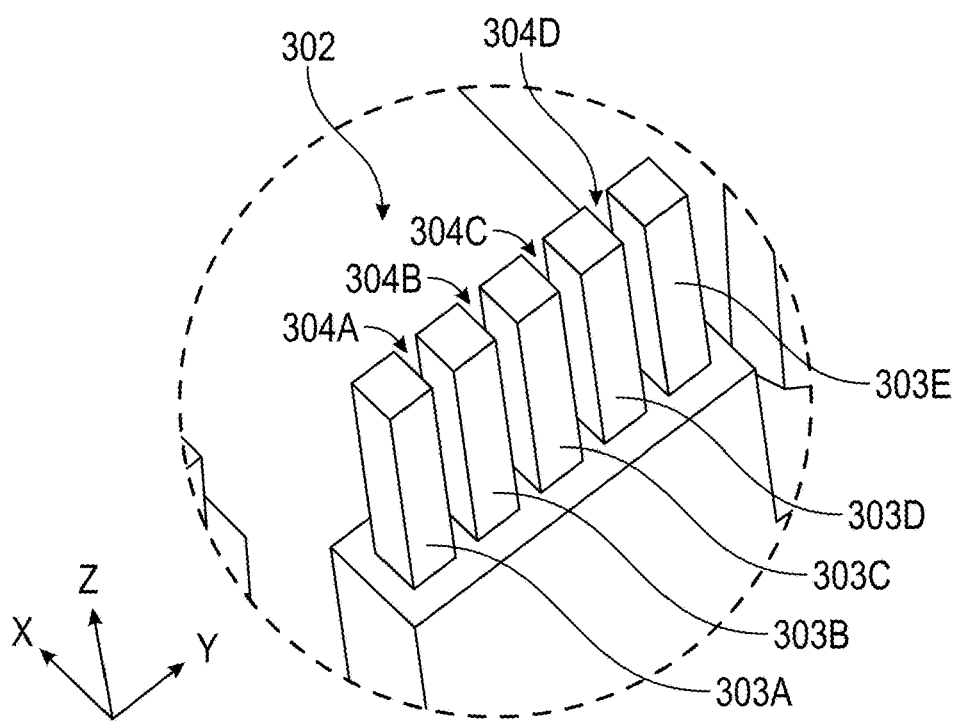
FIG. 3C is a closer perspective view of the upper portion of the example outer-diameter island side blocker shown in FIGS. 3A and 3B.

FIG. 3C is a closer perspective view of the upper portion 302 of the example segmented outer-diameter island side blocker 300A. The upper portion 302 includes a plurality of posts. In the example of FIG. 3C, the upper portion 302 comprises the post 303A, the post 303B, the post 303C, the post 303D, and the post 303E. In the example shown in FIG. 3C, the post 303A, post 303B, post 303C, post 303D, and post 303E are substantially identical and substantially cuboid. Other post shapes are possible and are also contemplated (e.g., cylindrical, prism-shaped, etc.). Similarly, although FIGS. 3A, 3B, and 3C show posts that are substantially identical, this is not a requirement. Different posts can have different shapes and sizes.

The posts are separated from each other by gaps, which can be substantially identical, or they can be different. FIG. 3C shows the gap 304A between the post 303A and the post 303B, the gap 304B between the post 303B and the post 303C, the gap 304C between the post 303C and the post 303D, and the gap 304D between the post 303D and the post 303E. The gaps between posts can be any suitable value. For example, they can be between about 10 microns and about 50 microns.

It will be appreciated that the sizes and shapes of the gaps and the posts of the segmented outer-diameter island side blocker 300A can be selected to allow a desired airflow into the outer-diameter side cavity 110A (or, for the segmented inner-diameter island side blocker 300B, into the inner-diameter side cavity 110B) while blocking particles larger than the gaps. It will also be appreciated that the segmented outer-diameter island side blocker 300A can be used to control airflow into the outer-diameter side cavity 110A (and, likewise, that the segmented inner-diameter island side blocker 300B can be used to control airflow into the inner-diameter side cavity 110B).

Figure 3D:
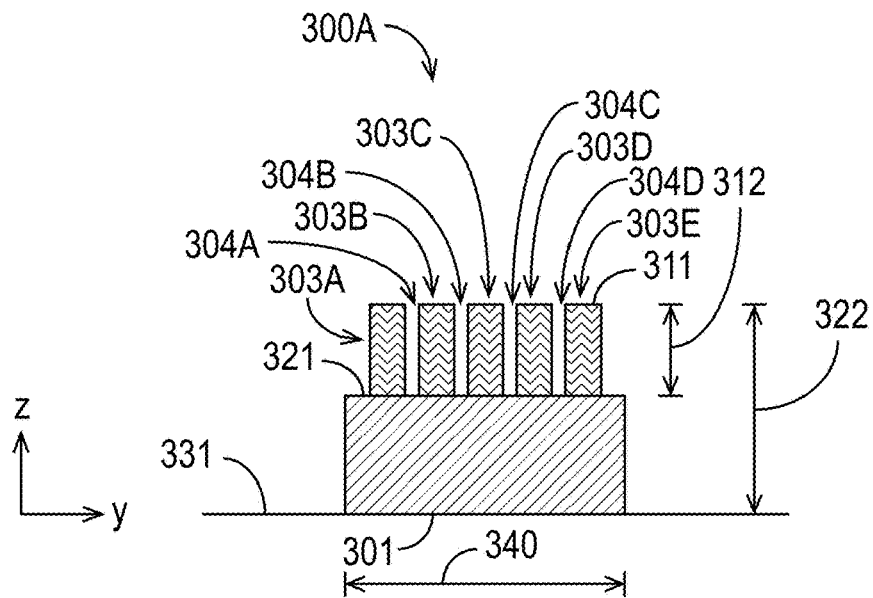
FIG. 3D is a view of the outer-diameter island side blocker as seen from beyond the outer-diameter edge.
Figure 3E:
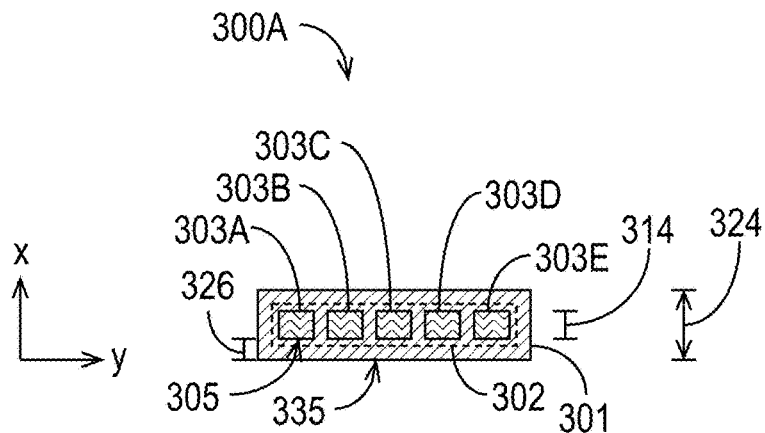
FIG. 3E is an ABS view of the outer-diameter island side blocker.
Figure 3F:
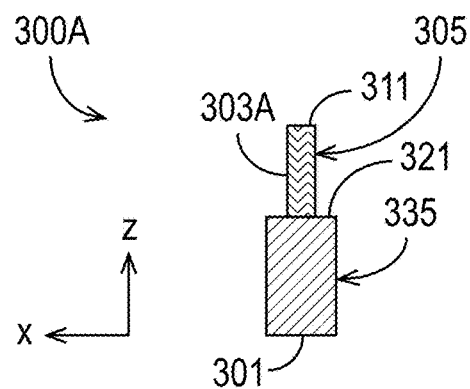
FIG. 3F is an end view of the outer-diameter island side blocker.

FIG. 3D is a view of the segmented outer-diameter island side blocker 300A as seen from beyond the outer-diameter edge 135 of the slider 100B. FIG. 3E is an ABS view of the segmented outer-diameter island side blocker 300A. FIG. 3F is an end view of the segmented outer-diameter island side blocker 300A from the trailing side. As shown in FIGS. 3D, 3E, and 3F, the segmented outer-diameter island side blocker 300A has a surface at a first level 311 and a surface at a second level 321. The surface at the first level 311 is the top surface of the upper portion 302, and the surface at the second level 321 is the top surface of the lower portion 301.

The surface at the first level 311 is recessed from the surfaces at the top level of the ABS 150 described above (e.g., surfaces at the same level as the surface 101). The surface at the second level 321 is recessed from the surface at the first level 311 by a distance 312. The base of the segmented outer-diameter island side blocker 300A is at a third level 331, which is also the level of the outer-diameter side cavity 110A. The surface at the third level 331 is recessed from the surface at the first level 311 by a distance 322. Thus, the segmented outer-diameter island side blocker 300A comprises a first surface at the first level 311 and a second surface at the second level 321.

In an orientation of the slider in which the plurality of media-facing surfaces is oriented upward, the surface at the first level 311 is above the surface at the second level 321, and the surface at the second level 321 is above the surface at the third level 331. All of the surface at the first level 311, surface at the second level 321, and surface at the third level 331 are below the surfaces at the top (uppermost) level of the ABS 150 (assuming the ABS 150 is oriented upward). The surface at the first level 311 may be recessed from surfaces at the top level of the ABS 150 by between about 100 nm and about 200 nm, and the surface at the second level 321 may be recessed from the surface at the first level 311 by between about 300 nm and about 1500 nm.

In the example illustrated in FIGS. 3A through 3F, the segmented outer-diameter island side blocker 300A comprises the lower portion 301, which is cuboid, and the upper portion 302, which comprises cuboid posts. The lower portion 301 has a uniform width 324 in the x-direction and a uniform length in the y-direction. The length 340 of the lower portion 301 may be, for example, between about 20 microns and about 200 microns. Each of the posts in the example of the upper portion 302 also has a uniform width in the x-direction and a uniform length in the y-direction. Specifically, each of the post 303A, post 303B, post 303C, post 303D, and post 303E has a width 314 in the x-direction. The uniform width 314 of the posts of the upper portion 302 and uniform width 324 of the lower portion 301 are advantageous because they cause less degradation to crown sensitivity than other shapes (e.g., a prism oriented on its end). Similarly, it is advantageous to keep the width 314 and width 324 thin to mitigate degradations to crown sensitivity.

In the example shown in FIGS. 3A through 3F, the width 324 is greater than the width 314 but this is not a requirement. FIG. 3E also shows that the outer surfaces 305 of the posts in the upper portion 202 are recessed from the outer surface 335 of the lower portion 301, and, therefore, from the outer-diameter edge 135 of the slider 100B, by a distance 326.

In the example of FIGS. 3A through 3F, the lower portion 301 has a larger volume than the upper portion 302, but this is not a requirement. Furthermore, FIGS. 3A through 3F illustrate an example of an segmented outer-diameter island side blocker 300A that has five posts in the upper portion 302, but it is to be understood that the upper portion 302 can have any number of posts or similar features. For example, the upper portion 302 can have as few as two posts or as many posts as can be manufactured.

Although FIG. 3A shows an example of a slider 100B that has two side blockers, namely the segmented outer-diameter island side blocker 300A and the segmented inner-diameter island side blocker 300B, as explained above, it is to be appreciated that a slider can include only one side blocker (e.g., only segmented outer-diameter island side blocker 300A or segmented inner-diameter island side blocker 300B). Similarly, although FIG. 3A illustrates an segmented outer-diameter island side blocker 300A and an segmented inner-diameter island side blocker 300B that are substantially identical (translated and perhaps rotated), it is to be appreciated that the segmented outer-diameter island side blocker 300A and the segmented inner-diameter island side blocker 300B can be different from each other in size, shape, etc. For example, one of the segmented outer-diameter island side blocker 300A or segmented inner-diameter island side blocker 300B could be replaced by one of the outer-diameter island side blocker 200A or inner-diameter island side blocker 200B shown in FIGS. 2A through 2E. Furthermore, all of FIGS. 2A through 3F show only examples of side blockers. Other designs are possible, as will be appreciated in view of the disclosures herein.

As compared to other approaches that might be attempted to improve particle robustness, such as extending leading or trailing side rails, the disclosed island-type side blockers have a much less significant impact on crown sensitivity. Furthermore, the disclosed island-type side blockers do not substantially change the stability of the slider ABS.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as "substantially equal" means that the two lengths are the same for all practical purposes, but they may not (and need not) be precisely equal at sufficiently small scales. As another example, a structure that is "substantially vertical" would be considered to be vertical for all practical purposes, even if it is not precisely at 90 degrees relative to horizontal.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. A slider, comprising:
a first side-edge surface;
a second side-edge surface; and
an air-bearing surface (ABS) comprising:
a first side cavity adjacent to the first side-edge surface, and
a first island side blocker situated at a mouth of the first side cavity,
wherein:
a first outer surface of the first island side blocker forms a portion of the first side-edge surface,
a second outer surface of the first island side blocker is recessed from the first side-edge surface,
a first side opening is situated on a leading side of the first island side blocker, and
a second side opening is situated on a trailing side of the first island side blocker.

2. The slider recited in claim 1, wherein:
the ABS includes a plurality of media-facing surfaces at a plurality of levels, the plurality of levels including a first level, a second level, and a third level, each of the plurality of media-facing surfaces being substantially perpendicular to the first side-edge surface and the second side-edge surface, wherein, in an orientation of the slider in which the plurality of media-facing surfaces is oriented upward, the first level is above the second level, and the second level is above the third level; and
the first island side blocker comprises a first surface at the first level, and a second surface at the second level, wherein the first level is recessed from a top level of the ABS.

3. The slider recited in claim 1, wherein the first island side blocker comprises a lower portion and an upper portion, wherein the lower portion includes the first outer surface and the upper portion includes the second outer surface.

4. The slider recited in claim 3, wherein a length of the lower portion is between about 20 microns and about 200 microns.

5. The slider recited in claim 3, wherein a width of the lower portion is greater than a width of the upper portion.

6. The slider recited in claim 5, wherein the width of the lower portion is uniform, and the width of the upper portion is uniform.

7. The slider recited in claim 3, wherein a shape of the lower portion is cuboid, and a shape of the upper portion is cuboid.

8. The slider recited in claim 7, wherein a volume of the lower portion is larger than a volume of the upper portion.

9. The slider recited in claim 3, wherein the upper portion comprises a plurality of posts.

10. The slider recited in claim 9, wherein the plurality of posts comprises a first post and a second post, and wherein the first post and the second post are substantially identical.

11. The slider recited in claim 10, wherein the first post and the second post are substantially cuboid.

12. The slider recited in claim 9, wherein the plurality of posts includes at least five posts.

13. The slider recited in claim 1, wherein the ABS further comprises:
a second side cavity adjacent to the second side-edge surface, and
a second island side blocker situated at a mouth of the second side cavity,
and wherein:
a first outer surface of the second island side blocker forms a portion of the second side-edge surface,
a second outer surface of the second island side blocker is recessed from the second side-edge surface,
a third side opening is situated on a leading side of the second island side blocker, and
a fourth side opening is situated on a trailing side of the second island side blocker.

14. A data storage device, comprising:
a recording medium; and
a slider, wherein the slider comprises:
a first side-edge surface,
a second side-edge surface, and
an air-bearing surface (ABS) facing the recording medium, the ABS comprising:
a first side cavity adjacent to the first side-edge surface, and
a first island side blocker situated at a mouth of the first side cavity,
wherein:
a first outer surface of the first island side blocker forms a portion of the first side-edge surface,
a second outer surface of the first island side blocker is recessed from the first side-edge surface,
a first side opening is situated on a leading side of the first island side blocker, and
a second side opening is situated on a trailing side of the first island side blocker.

15. A slider comprising an air-bearing surface (ABS), the ABS comprising:
a first side cavity;
a first island side blocker situated at a mouth of the first side cavity;
a second side cavity; and
a second island side blocker situated at a mouth of the second side cavity,
wherein:
the first island side blocker comprises a first lower portion and a first upper portion, wherein the first upper portion is recessed from a first side edge of the slider, and
the second island side blocker comprises a second lower portion and a second upper portion, wherein the second upper portion is recessed from a second side edge of the slider.

16. The slider recited in claim 15, wherein the second island side blocker is substantially a translated mirror image of the first island side blocker.

17. The slider recited in claim 15, wherein the ABS includes a plurality of media-facing surfaces at a plurality of levels, the plurality of levels including a first level, a second level, and a third level, wherein the first level is recessed from a top level of the ABS, and wherein:
the first upper portion comprises a first surface at the first level,
the first lower portion comprises a first surface at the second level,
the second upper portion comprises a second surface at the first level, and
the second lower portion comprises a second surface at the second level.

18. The slider recited in claim 15, wherein:
a width of the first lower portion is greater than a width of the first upper portion,
a width of the second lower portion is greater than a width of the second upper portion,
the width of the first lower portion is approximately equal to the width of the second lower portion, and
the width of the first upper portion is approximately equal to the width of the second upper portion.

19. The slider recited in claim 18, wherein:
the width of the first lower portion is uniform,
the width of the first upper portion is uniform,
the width of the second lower portion is uniform, and
the width of the second upper portion is uniform.

20. The slider recited in claim 15, wherein each of the first lower portion, the first upper portion, the second lower portion, and the second upper portion is cuboid.

21. The slider recited in claim 15, wherein:
the first upper portion is segmented,
the first lower portion is non-segmented,
the second upper portion is segmented, and
the second lower portion is non-segmented.

22. The slider recited in claim 21, wherein each of the first upper portion and the second upper portion comprises at least three segments.

23. The slider recited in claim 22, wherein:
a first segment of the first upper portion is substantially identical to a second segment of the first upper portion, and
a first segment of the second upper portion is substantially identical to a second segment of the second upper portion.

\* \* \* \* \*